3,763,223
PROCESS FOR PRODUCING POLYESTERS FROM CARBAMYLOXY BENZOIC ACID HALIDES
Takeshi Yamahara, Kobe, and Shinji Nakamura, Ibaraki, Japan, assignors to Sumitomo Chemical Company, Limited, Osaka, Japan
No Drawing. Filed Aug. 30, 1972, Ser. No. 284,987
Claims priority, application Japan, Sept. 4, 1971, 46/68,279
Int. Cl. C08g 17/02
U.S. Cl. 260—47 C    3 Claims

ABSTRACT OF THE DISCLOSURE

The present invention relates to a process for producing a polyester, which involves polymerizing by condensation a monomer represented by the general formula:

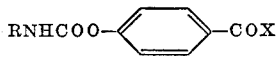

wherein R is a hydrogen atom, an alkyl group having 1 to 6 carbon atoms, an aralkyl group having 7 to 10 carbon atoms or an aryl group having 6 to 10 carbon atoms and X is a halogen atom, without using any catalyst under heating. Also provided herein are polyesters produced by the aforementioned process. The final products exhibit good thermostability characteristics.

---

The present invention relates to a process for producing polyesters, and particularly to a process for producing polyesters, which comprises polymerizing by condensation a monomer represented by the general formula:

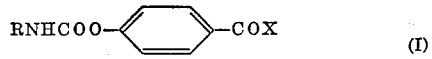

wherein R is a hydrogen atom, alkyl group having 1 to 6 carbon atoms, aralkyl group having 7 to 10 carbon atoms, or aryl group having 6 to 10 carbon atoms and X is a halogen atom, without using any catalyst under heating.

Heretofore, various processes have been proposed to produce high molecular weight polyesters from hydroxybenzoic acid. For example, Japanese patent publication No. 6,796/1971 discloses a process for condensing phenyl esters of hydroxybenzoic acid in a liquid state at a temperature sufficiently high to cause condensation. In such a process, there has been a defect of requiring heating at high temperatures for an extremely long period of time. Further, there is known a process using hydroxybenzoyl chlorides. However, this process of high molecular weight polyesters have hardly been produced.

The present inventors have made various studies on a process for producing high molecular weight polyesters, and have accomplished the present invention.

According to the present invention, a process for producing polyesters comprises polymerizing by condensation a monomer represented by the General Formula I

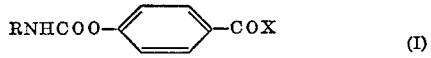

wherein R is a hydrogen atom, alkyl group having 1 to 6 carbon atoms, aralkyl group having 7 to 10 carbon atoms or aryl group having 6 to 10 carbon atoms and X is a halogen atom, without using any catalyst under heating.

In the above-mentioned general formula, R is hydrogen or an alkyl group such as methyl, ethyl, propyl, etc., an aralkyl group such as benzyl, etc., or an aryl group such as phenyl, etc. and also includes these groups having a suitable substituent, and X is a halogen atom such as fluorine, chlorine, bromine and iodine, chlorine being particularly preferable among them.

The methods of producing the monomer used in the process of the present invention is not particularly limited. The monomer may be easily produced, for example, by reacting a urethane compound, obtained by contacting hydroxybenzoic acid with an isocyanate compound, with a halogenating agent, for example, thionyl chloride, $POCl_3$, etc.

Examples of the monomer having the General Formula I include 4-(N-methylcarbamyloxy)benzoic acid chloride, 4-(N-isopropylcarbamyloxy)benzoic acid chloride, 4-(N-phenylcarbamyloxy)benzoic acid chloride, 4-(N-tolylcarbamyloxy)benzoic acid chloride, and 4-(N-benzylcarbamyloxy)benzoic acid chloride.

In carrying out the present invention, the polymerization of the monomer having the General Formula I can be effected by solid phase condensation or condensation in heat transfer medium. That is, in the process of the present invention, in order to condense the monomer under heating, the monomer may be heated in a powder state as it is, or it is possible to heat it in a suitable medium to facilitate the control of the reaction.

Among the media, organic solvents having a suitable boiling point can be used. The organic solvents that are inert to carboxylic acid halides are preferable, for example, aromatic hydrocarbons, chlorinated hydrocarbons, aromatic ethers, etc.

Examples of the organic solvent include biphenyl, biphenylether, polychlorobiphenyl, 1,2,3-trichlorobenzene, benzyldiphenylmethane, diphenylethane, benzyldiphenylethane and alkylnaphtharene.

The temperature at which the monomer is heated may be within the temperature range of from the lowest possible condensation temperature of the monomer to the decomposition temperature of the resulting polyester. This temperature range is from 100 to 450° C., and particularly preferably from 200 to 400° C. Since the suitable temperature range also depends on the degree of condensation, it is possible to take such steps as to heat at relatively low temperature at the early stage and to raise the temperature as the condensation proceeds. A characteristic feature of the process of the present invention is that the period of heating for condensation is generally enough with a time within 5 hours and does not require heating for a long time at high temperatures.

The pressure upon heating is preferably at ordinary pressure, but the heating may be carried out under reduced pressure as required, for example when a medium is not used.

In the process of the present invention, some nitrogen-containing compounds are produced at the time of condensation under heating. Such products are desirably separated and removed from the reaction system by a suitable way, for example, by an inert gas flow. When such removed compounds containing nitrogen are isocyanate compounds, it is economical to use them for the synthesis of the monomer.

The polyesters obtainable by the process of the present invention show good thermostability for themselves, but may be substituted, as required, with a suitable agent for example phenols, alcohols, etc. at their terminal group.

EXAMPLE 1

Five grams of 4-(N-phenylcarbamyloxy)benzoic acid chloride was added to 300 ml. of 1,2,3-trichlorobenzene. The reaction mixture was heated to 218° C. and maintained at that temperature for 4 hours. After being cooled the mixture was filtered. When the solid was washed with ethyl ether and dried, 1.5 g. of a powder solid was obtained. This solid was found to consist essentially of para-oxybenzoyl polyester from the results of elementary analysis (69.81% carbon, 3.45% hydrogen) and infrared absorption spectrum. From the analysis of the terminal chlorine, this polyester was found to have an average molecular weight of more than about 20,000. No change in weight was observed when heating in air up to 400° C.

EXAMPLE 2

Five grams of 4-(N-phenylcarbamyloxy)benzoic acid chloride was added to 300 ml. of benzyldiphenylmethane. The reaction mixture was heated to 320° C. and maintained at that temperature for one hour. After the mixture was cooled it was filtered. When the solid was washed with ethyl ether and dried, 1.6 g. of powder solid was obtained. This solid did not melt at a temperature above 400° C. but decomposed. From the analysis of the terminal chlorine, the average molecular weight was found to be about 28,000.

EXAMPLE 3

The same procedure as in Example 2 was repeated except that the heating was carried out at 360° C. for 5 hours in a nitrogen flow. The solid thus obtained was 1.3 g. and showed no change in weight up to 450° C. The analysis of the terminal chlorine showed an average molecular weight of about 40,000.

EXAMPLE 4

Ten grams of 4-(N-phenylcarbamyloxy)benzoic acid chloride was heated to 240° C. under a reduced pressure of 30 mm. Hg and maintained at that temperature for 4 hours. The heating was carried out in a weak flow of nitrogen, and the regenerated product was condensed to recover 3.4 g. of phenyl isocyanate. The generated gas which did not condense was absorbed in water and determined quantitatively. The result showed that more than 99.5% of the chloride ions based on the quantity of the chlorine in the starting material had been caught. The remaining whitish brown solid was 3.1 grams in weight and its carbon content was 69.92%. The average molecular weight was about 30,000 from the terminal chlorine analysis.

EXAMPLE 5

Five grams of 4-(N-isopropylcarbamyloxy)benzoic acid chloride was added to 300 ml. of benzyldiphenyl methane. The reaction mixture was heated to 320° C. and maintained at that temperature for one hour. After the temperature was cooled it was filtered. When the solid was washed with ethyl ether and dried, 1.8 g. of a powder solid was obtained. This solid did not melt at a temperature above 400° C. but decomposed. From the analysis of the terminal chlorine, the average molecular weight was found to be about 25,000.

EXAMPLE 6

Five grams of 4-(N-benzylcarbamyloxy)benzoic acid chloride was added to 300 ml. of benzyldiphenyl methane. The reaction mixture was heated to 320° C. and maintained at that temperature for one hour. After the mixture was cooled it was filtered. When the solid was washed with ethyl ether and dried, 1.5 g. of a powder solid was obtained. This solid did not melt at a temperature above 400° C. but decomposed. From the analysis of the terminal chlorine, the average molecular weight was found to be about 26,000.

What is claimed is:

1. A process for producing a polyester, which comprises polymerizing by condensation a monomer represented by the general formula:

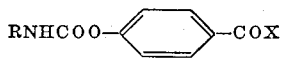

wherein R is a hydrogen atom, an alkyl group having 1 to 6 carbon atoms, an aralkyl group having 7 to 10 carbon atoms or an aryl group having 6 to 10 carbon atoms and X is a halogen atom, without any catalyst under heating in a powder state at a temperature of 100 to 450° C. within 5 hours.

2. A process according to claim 1 wherein the polymerization is carried out by condensing the monomer in a liquid organic medium that is inert to the monomer.

3. A process according to claim 2 wherein the liquid organic medium is selected from the group consisting of aromatic hydrocarbons, chlorinated hydrocarbons and aromatic ethers.

References Cited

UNITED STATES PATENTS

| | | | |
|---|---|---|---|
| 2,600,376 | 6/1952 | Caldwell | 260—47 |
| 2,728,747 | 12/1955 | Aelony et al. | 260—78.3 |
| 3,549,593 | 12/1970 | Takekoshi | 260—47 |

HAROLD D. ANDERSON, Primary Examiner

L. L. LEE, Assistant Examiner

U.S. Cl. X.R.

260—47 CZ, 47 IC